United States Patent
Froelich et al.

(10) Patent No.: US 9,055,443 B2
(45) Date of Patent: Jun. 9, 2015

(54) MOBILE DEVICE-TYPE LOCKING

(71) Applicant: T-Mobile USA, Inc., Bellevue, WA (US)

(72) Inventors: Raymond Froelich, Bellevue, WA (US); Adrian Buzescu, Bellevue, WA (US); Ahmad Arash Obaidi, Bellevue, WA (US); Alexandru Catalin Ionescu, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 13/660,350

(22) Filed: Oct. 25, 2012

(65) Prior Publication Data

US 2013/0109352 A1    May 2, 2013

Related U.S. Application Data

(60) Provisional application No. 61/552,353, filed on Oct. 27, 2011.

(51) Int. Cl.
*H04W 12/08* (2009.01)
*H04W 12/10* (2009.01)
*H04W 12/12* (2009.01)
*H04W 88/02* (2009.01)

(52) U.S. Cl.
CPC .............. *H04W 12/10* (2013.01); *H04W 12/12* (2013.01); *H04W 88/02* (2013.01)

(58) Field of Classification Search
CPC ... H04L 63/08; H04L 63/0428; G06F 3/0488; G06F 21/10
USPC ............. 455/411, 566; 345/173, 169; 726/27; 713/155
See application file for complete search history.

(56) References Cited

U.S. PATENT DOCUMENTS

| | | |
|---|---|---|
| 6,226,749 B1 | 5/2001 | Carloganu et al. |
| 6,317,836 B1 | 11/2001 | Goren et al. |
| 6,321,079 B1 | 11/2001 | Cooper |
| 6,327,660 B1 | 12/2001 | Patel |

(Continued)

FOREIGN PATENT DOCUMENTS

| | | |
|---|---|---|
| EP | 1359733 A1 | 11/2003 |
| WO | WO2004063871 A2 | 7/2004 |
| WO | WO2008077628 | 7/2008 |

OTHER PUBLICATIONS

PCT Search Report mailed Jan. 17, 2013 for PCT application No. PCT/US12/62050, 10 pages.

Lee, et al., "A New Delegation-Based Authentication Protocol for Use in Portable Communication Systems", IEEE Transactions on Wireless Communications, vol. 4, No. 1, Jan. 2005, pp. 57-64.

(Continued)

*Primary Examiner* — Phuoc H Doan
(74) *Attorney, Agent, or Firm* — Lee & Hayes, PLLC

(57) ABSTRACT

A device-type locking procedure is disclosed, where a trusted execution environment (TEE) of a user device retrieves a telecommunication service plan type identifier stored on an identification module of the user device. The TEE of the user device then initiates a service authentication procedure for a telecommunication service provider of the user device, based on the received plan type identifier and in conjunction with an optional service plan provisioning process. A service plan indicated by the plan type identifier is subsequently compared to a designated user device service plan via the TEE. Based on the comparison results, a determination is then made as to whether the user device should be locked or unlocked, depending on the device's current operating state.

17 Claims, 6 Drawing Sheets

(56) References Cited

U.S. PATENT DOCUMENTS

| | | |
|---|---|---|
| 7,689,204 B2 | 3/2010 | Dupuis et al. |
| 2005/0172135 A1 | 8/2005 | Wiersma |
| 2006/0075259 A1 | 4/2006 | Bajikar et al. |
| 2007/0154014 A1 | 7/2007 | Aissi et al. |
| 2007/0180269 A1 | 8/2007 | Irish et al. |
| 2008/0132226 A1 | 6/2008 | Carnall |
| 2008/0229092 A1 | 9/2008 | Dale et al. |
| 2008/0282084 A1 | 11/2008 | Hatakeyama |
| 2009/0083858 A1 | 3/2009 | Jennings et al. |
| 2009/0158419 A1 | 6/2009 | Boyce |
| 2009/0165119 A1 | 6/2009 | Ramanath |
| 2009/0325646 A1 | 12/2009 | Stewart et al. |
| 2010/0082968 A1 | 4/2010 | Beverly |
| 2010/0273452 A1 | 10/2010 | Rajann et al. |
| 2011/0076986 A1 | 3/2011 | Glendinning et al. |
| 2011/0081889 A1* | 4/2011 | Gao et al. ............ 455/411 |
| 2011/0307711 A1 | 12/2011 | Novak et al. |
| 2012/0058743 A1 | 3/2012 | Chen |
| 2012/0101941 A1 | 4/2012 | Kang et al. |
| 2013/0304616 A1* | 11/2013 | Raleigh et al. ............ 705/34 |
| 2014/0057597 A1 | 2/2014 | Velusamy et al. |

OTHER PUBLICATIONS

PCT Search Report and Written Opinion mailed Jul. 1, 2013 for PCT Application No. PCT/US13/37345, 10 pages.

PCT Search Report and Written Opinion mailed Jul. 30, 2013 for PCT Application No. PCT/US13/37332, 13 pages.

PCT Search Report and Written Opinion mailed Sep. 17, 2013 for PCT Application No. PCT/US13/37381, 11 pages.

Office action for U.S. Appl. No. 13/840,045, mailed on Jul. 30, 2014, Buzescu et al., "Remote Unlocking of Telecommunication Device Functionality", 11 pages.

Final Office Action for U.S. Appl. No. 13/840,045, mailed on Nov. 17, 2014, Adrian Buzescu, "Remote Unlocking of Telecommunication Device Functionality", 12 pages.

Office Action for U.S. Appl. No. 13/796,550, mailed on Jan. 26, 2015, Senthil Kumar Mulluppadi Velusamy, "SIM Level Mobile Security", 18 pages.

Office Action for U.S. Appl. No. 13/842,116, mailed on Jan. 27, 2015, Ahmad Arash Obaidi, "Secure Lock for Mobile Device", 7 pages.

Office Action for US Patent Application 13/839,189, mailed on Feb. 24, 2015, Alexandru Catalin Ionescu, "Secure Environment for Subscriber Device", 8 pages.

\* cited by examiner

MOBILE DEVICE-TYPE LOCKING

CROSS REFERENCE TO RELATED PATENT APPLICATIONS

This patent application claims priority filing benefit from U.S. Provisional Patent Application No. 61/552,353, filed Oct. 27, 2011, which is hereby incorporated by reference, in its entirety.

BACKGROUND

Modern telecommunication service providers generate much of their revenue by selling propriety wireless communication services and devices to their customers, under the good-faith assumption that these services and devices will be utilized in accordance with their intended purposes. For example, a particular telecommunication service provider may allow access to its wireless communication services by selling customers a prepaid or a postpaid, i.e., subscription-based, rate plan, which is generally associated with a respective customer's service level agreement. A telecommunication service provider can also require its customers to purchase corresponding, provider-specific communication devices, including cellular phones, personal digital assistants, tablet computers, and the like, in order to access its proprietary communication services.

Further, telecommunication service providers and mobile device manufacturers enter into lucrative business agreements that contractually bind select manufacturers' products to a particular service provider. In practice, these agreements are based on many important real-world considerations, including a service provider's customer-base, existing market share, forecast device sales, amongst many other factors. However, these mutually beneficial business relationships can be negatively impacted by customer deviations from both expected service usage and retail device purchases. Accordingly, it is important for service providers and affiliated device manufactures to collaborate with each other, in order to ensure that both contracting parties are able to achieve their independent and collective business objectives, in view of these types of consumer anomalies.

Adding to the problem of unanticipated customer deviations, many tech-savvy consumers have contrived new ways to frustrate the business and marketing objectives of both telecommunication service providers and device manufacturers, by employing both software and hardware work-arounds or hacks, which enable them to gain unauthorized access to telecommunication services and devices. This subset of consumers has been able to bypass security measures employed in proprietary communication devices of an affiliated telecommunication service provider, as well as to acquire unaffiliated, generic/unlocked devices, to avoid purchasing services and products from their respective telecommunication service provider.

For example, some telecommunication device users execute unauthorized software to breach certain security features of their respective device, in order to gain root-level access to their device's operating system (OS). Achieving this OS-level access allows a user to download additional applications, extensions, and themes that are not approved by the device's authorized service provider and/or media content provider(s). This misuse of a carrier-locked communication device is sometimes referred to in the industry as "jail-breaking" a device, and it can allow an unlocked, jail-broken device to gain access to unauthorized services of multiple telecommunication service providers.

Another example of a common hardware hack that has been employed by some telecommunication device users is to purchase an after-market product known as a "SIM-shim," which is a thin circuit board that is designed to fit between a service provider's Subscriber Identity Module (SIM) card and a telecommunication device's SIM socket. The SIM-shim device can be employed to allow a user to unlock his or her carrier-locked device, by simply inserting this add-on component into his or her device, thereby effectuating an override of device security features intended to keep the device restricted to services of a specific telecommunication service provider.

As would be understood by those skilled in the art, SIM cards enable a telecommunication service subscriber to be identified on a corresponding service provider's network by storing a unique International Mobile Subscriber Identity (IMSI) that can be retrieved and subsequently authenticated over-the-air by a corresponding service provider, each time a user device engages in communications with its telecommunication service provider. A SIM IMSI generally includes the following information: a Mobile Country Code (MCC), a Mobile Network Code (MNC), and a Mobile Subscriber Identification Number (MSIN). This information allows a user's provider-issued SIM card to be identified, registered, and authenticated with an issuing telecommunication service provider.

Modern SIM cards are sold "as is," meaning they are both static and rate plan specific, as their IMSI data cannot be modified after issuance. For this reason, each time a customer purchases a new telecommunication device or a new service plan offering from its service provider, the customer may be issued a different SIM card that must be added to the customer's existing user account at the service provider. Additionally, most SIM cards typically comprise only enough on-device memory to store static IMSI data along with minimal user contact information, such as a small number of important subscriber contact phone numbers.

Accordingly, there is an opportunity to improve upon security measures employed to protect against unauthorized usage of both proprietary telecommunication services and proprietary telecommunication devices. Additionally, there is also an opportunity for telecommunication service providers to be able to better monitor and manage customer access to, and usage of, its valuable network resources.

BRIEF DESCRIPTION OF THE DRAWINGS

The Detailed Description is set forth with reference to the accompanying figures.

DETAILED DESCRIPTION

This disclosure describes device security measures that can be employed by a telecommunication service provider to ensure that only authorized users and authorized communication devices gain access to its proprietary telecommunication services and network resources. These device security measures, which are described further herein, can prevent tech-savvy consumers from circumventing or otherwise defeating well-known network access safeguards with simple software hacks or after-market hardware implements that are designed to overcome proprietary communication device security features. It should be understood that although the disclosure describes several examples and related embodiments, the disclosure is not intended to be all-inclusive nor exhaustive in its descriptions. As such, it should be appreciated that the related subject matter of the disclosure can be reasonably modified, rearranged, or otherwise altered, to achieve similar results, without departing from the spirit and scope of the invention, as claimed.

Today, most wireless communication devices that are affiliated with a particular telecommunication service provider, such as smart phones, tablet devices, electronic-book devices, media player devices, and like, are issued with unique identification modules, e.g., subscriber identification modules or SIM cards, by a corresponding service provider. These identification modules allow wireless devices to be registered on a respective service provider's telecommunication network, such that the devices can thereafter communicate and transfer data over the telecommunication network, without having to re-register their device in order to facilitate subsequent communication sessions. Ensuing communication sessions for a registered device may be initiated after a service provider authenticates identification information stored in the user device's identification module.

Figure 1:
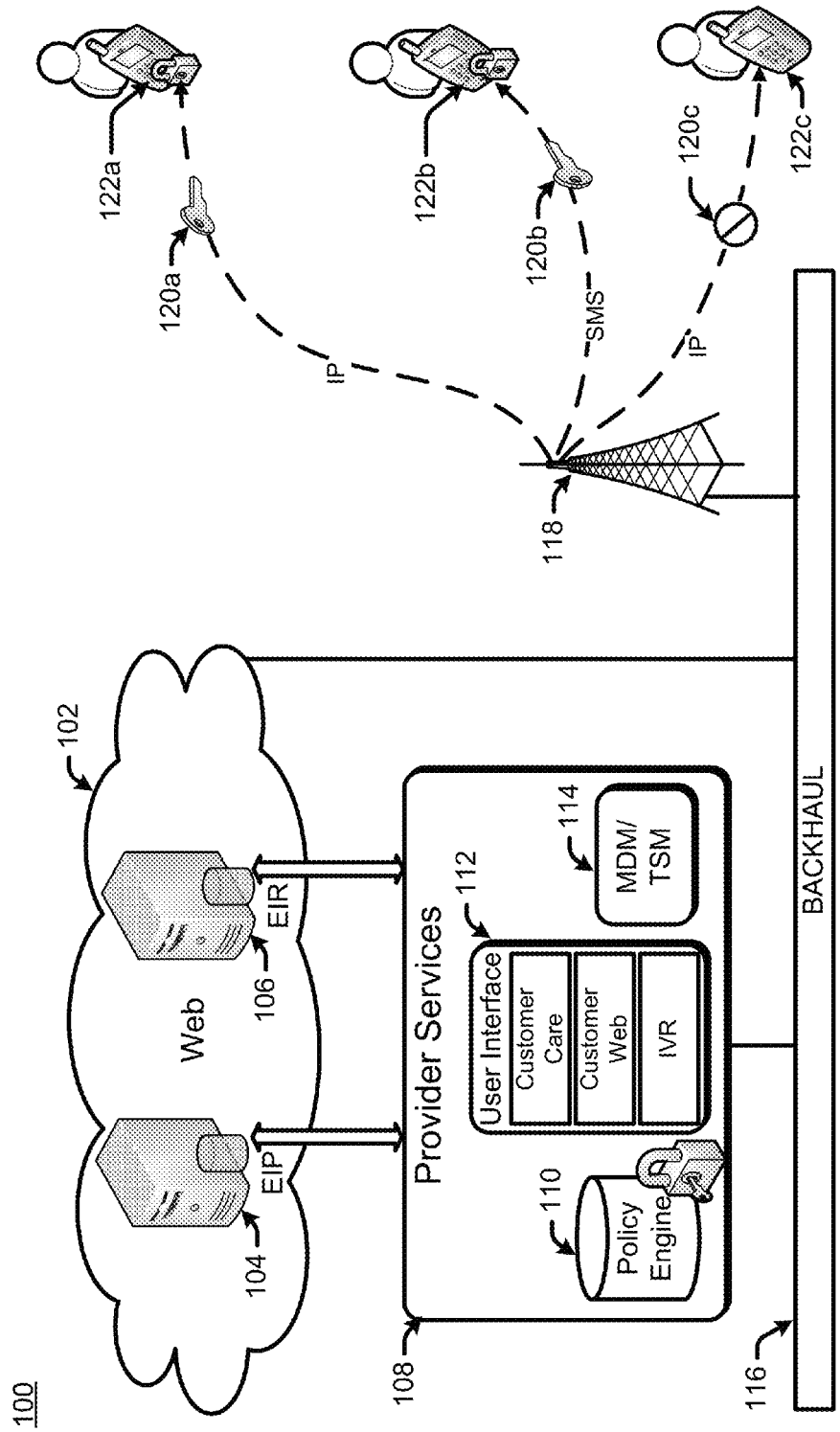
FIG. 1 is a top level diagram illustrating an example provider services entity for authenticating access to telecommunication network services, based on provisioned service plan identifications, in accordance with embodiments of the disclosure.

FIG. 1 depicts a telecommunication system/network 100, in accordance with various implementations of the disclosure. The telecommunication system 100 includes, but is not limited to, a provider services entity 108 in communication with multiple affiliated network servers, 104 and 106, and one or more network base stations 118, via portions of a network backhaul 116 and/or via other distributed portions of the network (not shown), respectively having connectivity to the world-wide web 102. Further, system 100 includes an over-the-air (OTA) interface that facilitates radio communications, e.g., wireless IP data and SMS communications 120a-c, and the like, between the provider services entity 108 and one or more user telecommunication devices 122a-c, via a network base station 118.

It should be appreciated that telecommunication system 100 of FIG. 1 is intended to depict a simplified representation of a telecommunication network that can employ any mixture of 2G, 3G, and 4G access technologies, which are commonly utilized in a real-world, heterogeneous telecommunication network deployments. These diverse communication technologies and alternative network topologies are neither depicted nor described within the context of the telecommunication system 100 of FIG. 1, for the sake of brevity.

However, it should be understood that the user devices 122a-c may be representative of any number common wireless communication devices, including cellular phones, tablet computers, electronic book devices, handheld gaming units, personal media players, etc., which can be connected to the telecommunication network 100 utilizing one or more wireless base stations 118, or any other common wireless or wireline network access technology. Further, the user communication devices 122a-c may be configured to run any known operating system, including but not limited to, Microsoft Windows Mobile®, Google Android®, Apple iOS®, Linux Mobile®, or any other common mobile device operating system.

It should also be appreciated that the telecommunication system 100 could be configured to employ any combination of common wireless broadband communication technologies, including, but not limited to, LTE, LTE Advanced, HSDPA/HSPA+, UMTS, CDMA, GSM, WiMax, and WiFi. Further, the backhaul portion 116 of the telecommunication network 100 may be configured to employ any common wireline communication technology, including but not limited to, optical fiber, coaxial cable, twisted pair cable, Ethernet cable, and power-line cable, along with any common wireless communication technology, such as those described above.

In an implementation, the provider services entity 108 may include, but is not limited to, the following elements: a policy engine component 110, a user interface (UI) component 112, and a mobile device management/trusted service manager (MDM/TSM) component 114. In a scenario where a particular user device has been locked, 122a-b, a user can be proactive in remedying this problem, by contacting its telecommunication service provider and interacting with its provider services entity 108 via select UI tools of its UI component 112. One of these UI tools of the UI component 112 can be a traditional customer care center that allows a user of a blocked communication device 122a to call in and speak directly with a customer service representative of its telecommunication service provider, in an attempt to have their device remotely unlocked 102a over-the-air (OTA).

Another UI tool of the UI component 112 may be a customer web interface that allows a user of a locked device 122b to utilize a dedicated customer account webpage (not shown) of a corresponding service provider website, to perform various user-driven account management functions. In one implementation, a user-driven account management function of a customer's account webpage can facilitate a user unlocking their communication device 122b over the Internet/Web 102, when authorized to do so by their telecommunication service provider. By way of example, this particular scenario may occur when a subscriber decides to pay a past due monthly service fee online, i.e., by credit card, using a secure online payment system of the service provider's website to initiate an unlock action 120b for their user device 122b. An additional UI tool of the UI component 112 may be an Interactive Voice Recorded (IVR) system, which allows a user to call a phone number associated with the IVR system and then follow pre-recorded voice instructions/prompts to attempt to unlock their communication device, in a similar manner to the other UI tool routines described above.

The policy engine component 110 of the provider services entity 108 can advantageously maintain user account information, as well as service provider policy rules within a resident or distributed service provider data store, to enable customer accounts and affiliated customer communication devices 122a-c to be managed by a corresponding telecommunication service provider using the provider services entity 108. In various scenarios, a particular service provider may also elect to enforce preferred service policy rules via its policy engine 110, in such a manner as to facilitate any of the above UI unlocking schemes with its UI component 112 tools. In addition, a service provider can also employ these same UI tools to facilitate its customer accounts/service representatives and/or its telecommunication service customers being able to lock or unlock specific communication devices, as well as block or unblock access to select communication services, in accordance with preferred service provider access rules.

In an embodiment, the provider services entity's 108 policy engine 110 may collaborate with its MDM/TSM component(s) 114 and/or its user interface component 112, as necessary, to carry out various device unlocking and locking procedures, as well as various access blocking and unblocking processes, in accordance with preferred access policies of an associated telecommunication service provider. By way of example, in a scenario where a user communication device 122c is either reported as being lost or stolen, the provider services entity 108 may interact with a local or networked equipment identity register (EIR) server 106, to identify the compromised device 120c, and then block or "brick" access 120c to the device 122c, in accordance with associated EIR policies that are accessible by the policy engine 110.

In another embodiment, the provider services entity's 108 policy engine 110 may interface with its MDM/TSM component 114 and/or its user interface component 112, to carry out various device unlocking and locking procedures, as well as various access blocking and unblocking processes, in accordance with preferred accounting and payment policies of an associated telecommunication service provider. For example, in a scenario where a customer account, associated with a particular user communication device 122c, is past due or when a prepaid service has expired, the provider services entity 108 may interact with a local or networked equipment identity payment (EIP) server 104, to identify a device 120c associated with the delinquent customer account, and then block or "brick" access 120c to the device 122c, in accordance with associated EIP policies that are accessible by the policy engine 110.

In various implementations, the MDM/TSM component 114 of the provider services entity 108 may communicate device unlocking triggers 120a-b or service blocking triggers 120c to the communication devices 122a-c using short messaging service (SMS) messages, i.e., via a short messaging service center (SMSC), Internet Protocol (IP) messages, i.e., via gateway GPRS and/or serving GPRS support nodes (GGSNs or SGSNs), or by any other common messaging protocol. It should be understood that a particular messaging protocol employed by a service provider to send corresponding unlocking, locking, unblocking, and/or blocking triggers, can be determined and/or selected ahead of time, or dynamically, based on existing network infrastructure constraints and/or various determined network communication states, such as network states associated with communications resource capacity, congestion, interference, etc.

Figure 2:
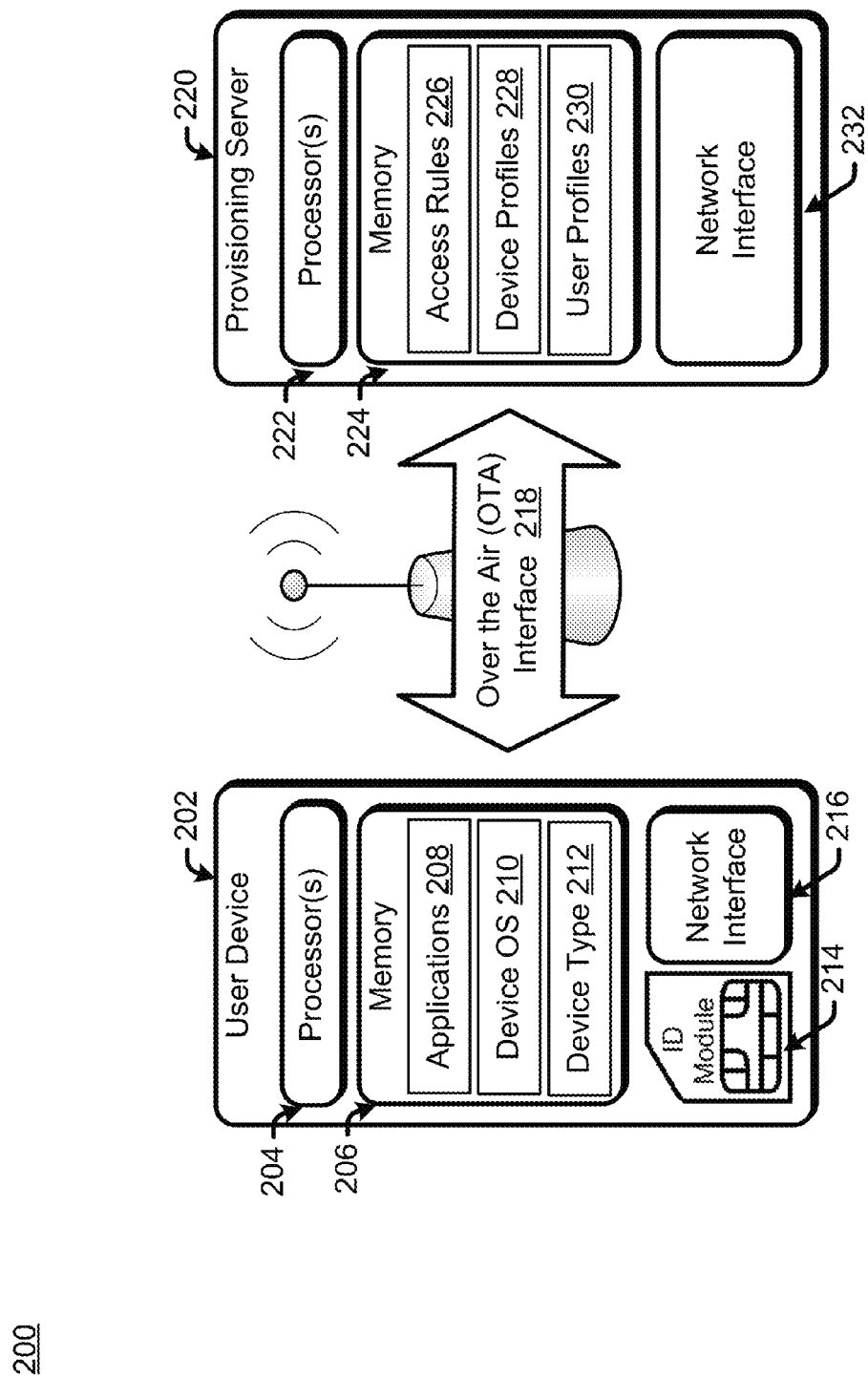
FIG. 2 is an example hardware platform employed in over-the-air (OTA) provisioning of service identification information, in accordance with embodiments of the disclosure.

FIG. 2 depicts a multi-device hardware platform 200 employed during an OTA interface 218 provisioning procedure, where a user device 202 is in communication with a service provider device, designated as a provisioning server 220. The user device 202 may be representative of any of the communication devices 122a-c of FIG. 1, and the provisioning server 220 may be representative of the provider services entity 108, of in FIG. 1. In an embodiment, the user device 202 may include, but is not limited to, one or more processor(s) 204, a memory 206 storing various software applications 208, a device operating system (OS) 210, as well as a device type identifier 212, an identification module 214, and a network interface 216.

Although not explicitly depicted in FIG. 2, each of the one or more processor(s) 204, can include at least a central processing unit (CPU) having numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 204 may also be responsible for executing all computer applications 208 stored in the user device's 202 memory 206, which can be associated with common types of volatile (RAM) and/or nonvolatile (ROM) memory.

The device type identifier 212 of the user device 202 may be associated with an indication of a particular device model and serial number, as well as a particular telecommunication service provider and/or an associated service/rate plan. In an embodiment, the device type identifier 212 can indicate the device 202 as being associated with either a prepaid rate plan or a postpaid rate plan of a particular telecommunication service provider. In this way, the user device 202 can be sold for a particular purpose, such as a low-cost prepaid phone, and its corresponding device type identifier 212 can designate the device as being intended for this purpose, independent from service identifier indications of the user device's 202 ID module 214. In some scenarios, the ID module 214 of the user device 202 can indicate a customer account, maintained by a service provider entity, as being associated with a particular rate plan type of a telecommunication service provider. Customer rate plans may be associated with either prepaid rate plans or a postpaid, subscription-based rate plans.

In various implementations, a rate plan associated with the device type identifier 212 may be the same as, or different from, a rate plan type associated with a service identifier of the ID module 214. Additionally, a telecommunication service provider associated with the device type identifier 212 may be the same as, or different from, a telecommunication service provider associated with a service identifier of the ID module 214. Further, the network interface 216 of the user device 202 may include one or more device transceivers, and optionally, one or more device transcoders, such that the user device 202 can communicate (transmit and receive) data between itself and the provisioning server 220 of its telecommunication service provider via the OTA interface 218.

In an embodiment, the provisioning server 220 of an affiliated telecommunication service provider may include, but is not limited to, one or more processor(s) 222, a memory 224 storing sets of service provider access rules 226, proprietary user device profiles 210, as well as user/subscriber profiles 230, and a network interface 216 enabling the provisioning server 220 to communicate with one or more user device(s) 202 using the OTA interface 218.

Each of the one or more processor(s) 222 of the provisioning server 220 may include a CPU having numerous ALUs that perform arithmetic and logical operations, as well as one or more CUs that extract instructions and stored content from processor cache memory and then executes these instructions by calling on the ALUs, as necessary, during program execution. The processor(s) 222 may also responsible for executing all computer programs, and retrieving all data, stored in the server's 220 memory 224, which may be associated with any common type of volatile (RAM) and/or nonvolatile (ROM) memory.

In an embodiment the access rules 226 stored in the memory 224 of the provisioning server 220 may correspond to the above-mentioned policy rules associated with the policy engine component 110 of the provider services entity 108. The device profiles 228 may correspond to data associated with the device type identifiers 212 for proprietary user devices 202 sold by a particular telecommunication service provider. In this way, a service provider can maintain profiles for its customers' devices 202, which indicate a respective user device's identification information and intended purpose. Additionally, the user profiles 230 may correspond to data associated with the ID module 214 of the user device 202. Accordingly, the user profiles 230 can contain customer account information maintained by a telecommunication service provider, including, but not limited to, customer identification information and customer rate plan data.

Figure 3:
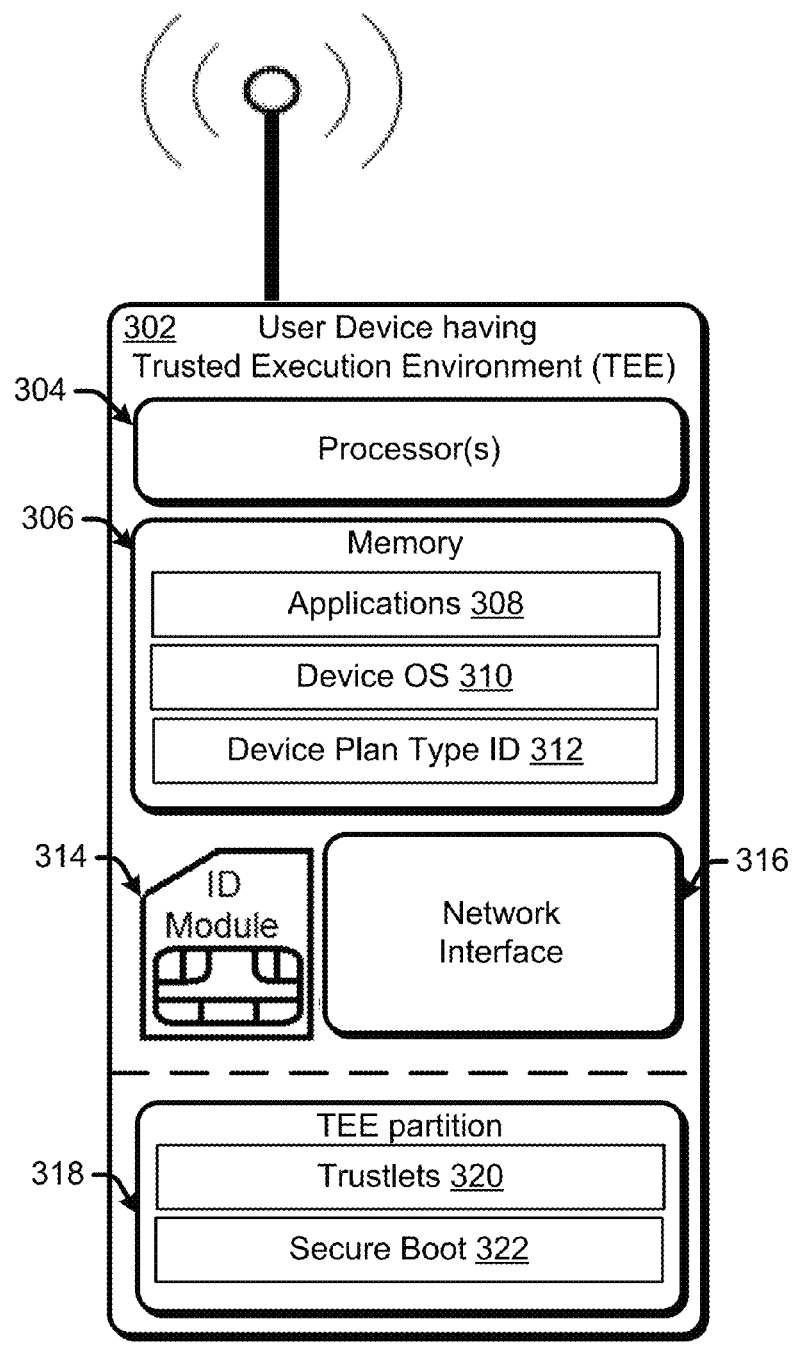
FIG. 3 is an example hardware platform of a user communication device having a trusted execution environment (TEE) partition, in accordance with embodiments of the disclosure.

FIG. 3 depicts a hardware platform 300 of a user device 302 having a trusted execution environment (TEE) partition 318, in accordance with various embodiments of the disclosure. Similar to that which was discussed above for the user device 202 of FIG. 2, the user device with the TEE 300 of FIG. 3, may be representative of any of the communication devices 122a-c of FIG. 1. In an embodiment, the user device 302 may include, but is not limited to, one or more processor(s) 304, a memory 306 storing various software applications 308, a device operating system (OS) 310, as well as a device plan type identifier 312, an identification module 314, a network interface 316, and a TEE partition 318 storing secure Trustlet applications 320 and secure boot processes 322.

It should be understood that most of the user device 302 components of FIG. 3, i.e., those associated with reference numbers 304, 306, 308, 310, 312, 314, and 316, are analogous in function to corresponding user device 202 components of FIG. 2, i.e., those associated with reference numbers 204, 206, 208, 210, 212, 214, and 216, as described above. As such, the above description for the components of user device 202, also applies to the similarly-referenced device components of the user device with the TEE 302, with the exception of the TEE partition 318 portion of user device 302.

In various implementations, the TEE partition 318 may be stored in user device's 302 memory 306, or alternatively, within a separate, dedicated TEE memory (not shown). Similarly, the TEE partition 318 may also be configured to operate with a dedicated TEE processor (not shown) and/or with a dedicated TEE OS (not shown), which can allow the TEE partition 318 to operate independent from the user device's 302 main hardware components, including both its processor(s) 304 and memory 306. This dedicated TEE hardware scenario may be particularly beneficial during boot executions, to prevent any unauthorized access of the TEE partition 318. Further, in an exemplary implementation, the TEE partition 318 may also be configured to operate independent of the device operating system (OS) 310. As such, the TEE's secure Trustlet applications 320 and Boot processes 322 may be safely executed before and/or during concurrent executions of the device OS 310, without any requisite OS-level data sharing that could potentially corrupt the TEE partition 318.

Figure 4:
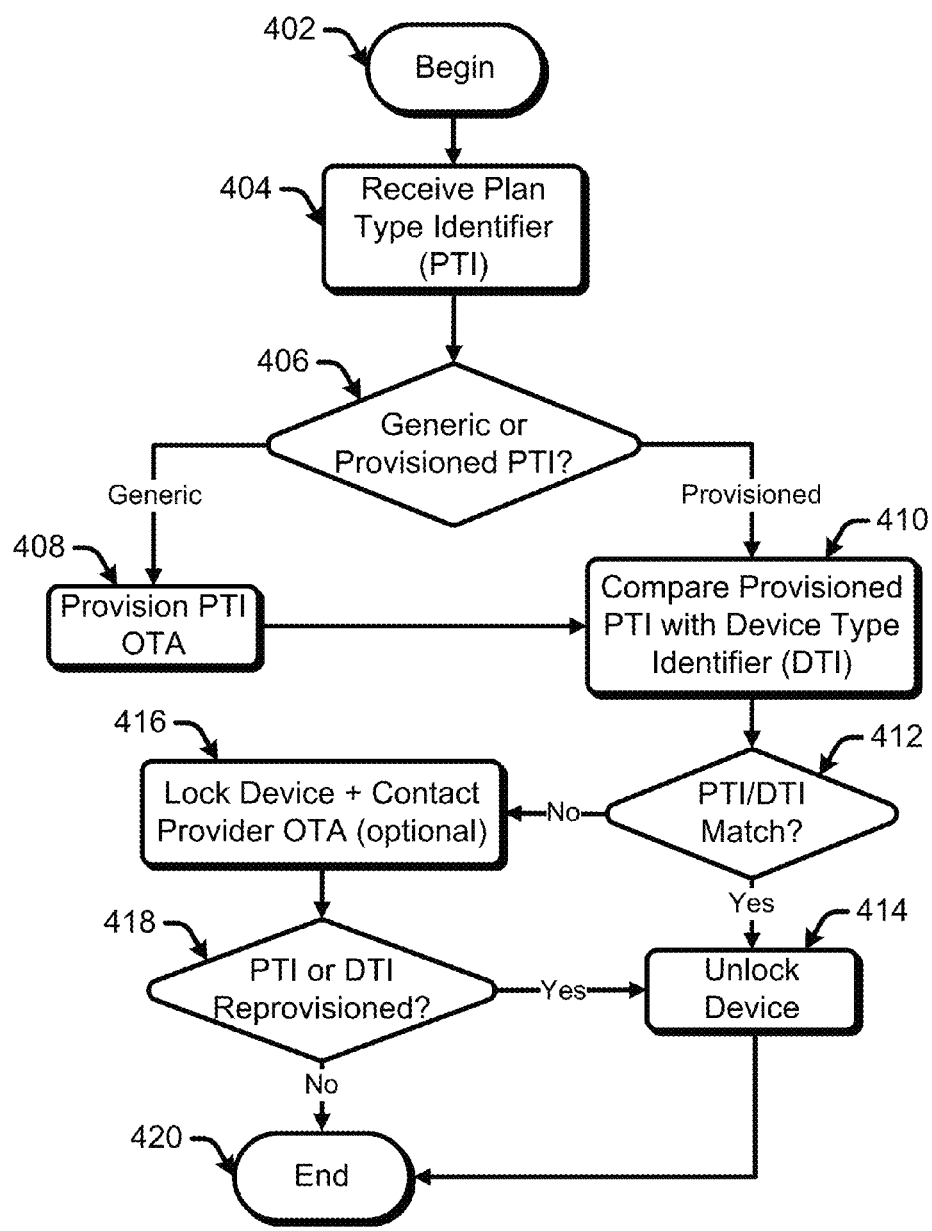
FIG. 4 is a flow chart of an example process for plan type identifier detection and provisioning implementations, in accordance with embodiments of the disclosure.
Figure 5:
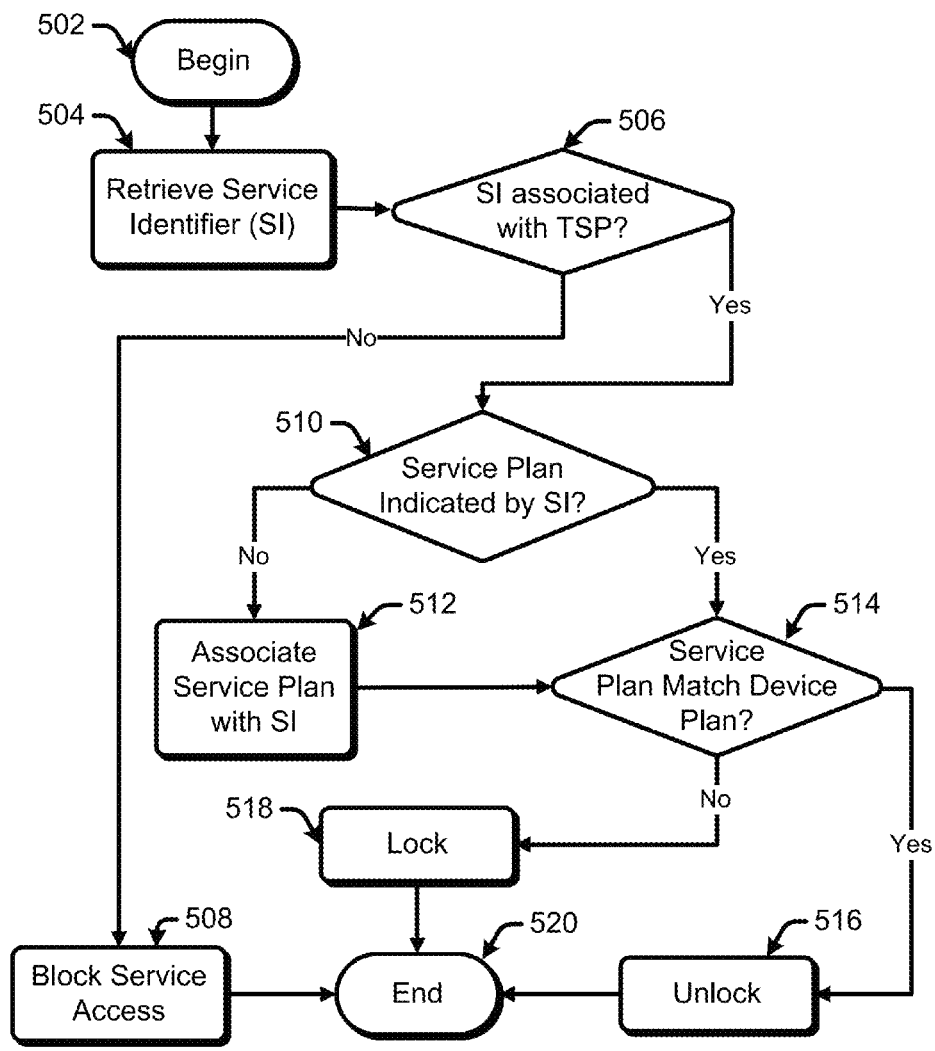
FIG. 5 is a flow chart of an example process for service identifier, service access, and device locking determinations, in accordance with embodiments of the disclosure.
Figure 6:
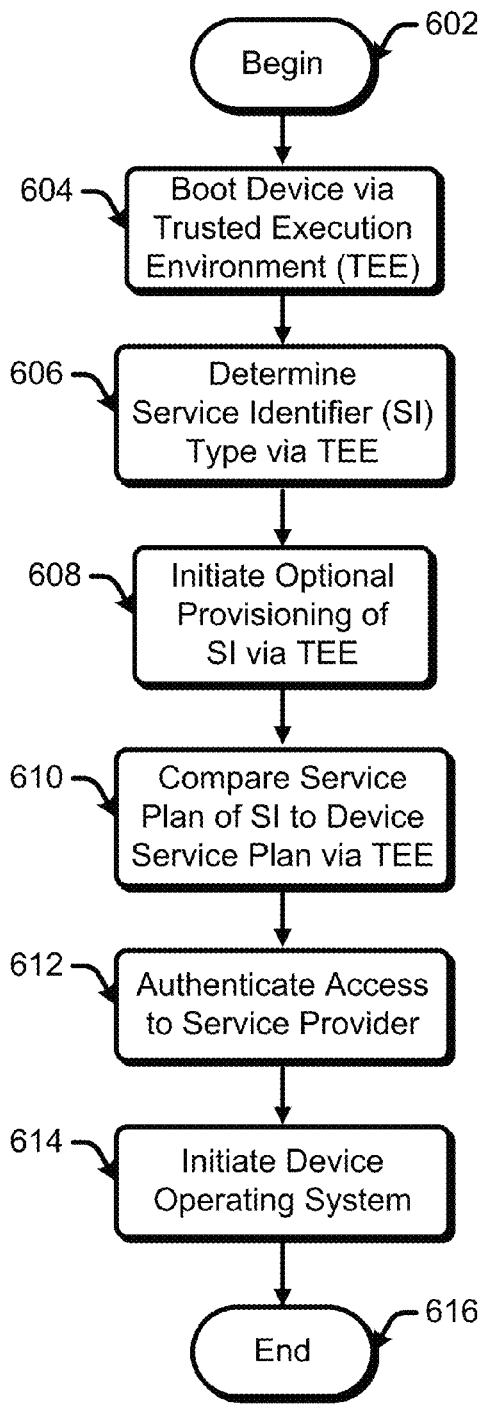
FIG. 6 is a flow chart of an example process for a trusted execution environment (TEE) deployment and corresponding service provider authentication processes, in accordance with embodiments of the disclosure.

In an embodiment, a secure Trustlet application 320 of the TEE partition 318 may be configured to communicate with the ID module 314 and the network interface 316 components of the user device 302, during various user device 302 authentication processes, described further herein with reference to the flow diagram processes 400, 500, and 600 of FIGS. 4-6. In other implementations, where a user device 202 does not have a TEE partition, the flow diagram processes 400 and 500 of FIGS. 4 and 5 may also be carried out by dedicated software that is stored within the memory 206 of the user device 202. In this scenario, the dedicated software may or may not be logically separated from the device OS 210 and the other user device applications 208.

In various implementations, a secure Trustlet application 320 may be configured to compare service identifier or plan type identifier data of the service identifier of the ID module 314 to corresponding device service identifier or device plan type identifier information of the device type ID element 312. A Trustlet application 320 may also be configured to retrieve identifier data from the ID module 314 and/or the device memory 306, in response to various device-side actions and/or provider-side actions, requiring service authentication. These actions, may include, but are not limited to, the following: inserting a new or existing ID module 314 in to a user device 302, resetting and/or powering on the user device 302, attempting or initiating communications with the user device 302, switching access providers and/or serving access points for the user device 302, etc. Further, the identifier retrieval and comparison functions can be carried out during, or in conjunction with, a secure boot process 322 that powers and activates only device 302 hardware necessary for performing identification module OTA provisioning and service authentication OTA, such as the ID module 314 and the network interface 316.

FIG. 4 depicts flow diagram procedure 400 associated with telecommunication service plan type identifier detection and provisioning, in accordance with embodiments of the disclosure. The procedure begins at block 402, which may occur in accordance with any of the above device-side actions or provider-side actions, requiring service authentication for a particular user device, 202 or 302. At block 404, a plan type identifier (PTI) of an ID module, 214 or 314, is received. Next, at decision block 406, it is determined whether the received PTI is associated with a generic identifier or a provisioned identifier. In one implementation, this determination may be made by a dedicated application residing in the memory 206 of a user device 202, whereas in another implementation, this determination can be made by a secure Trustlet application 320 residing in the TEE partition 318 of a user device 302, independent from, or in conjunction with, a secure boot process 322.

In a scenario where the received PTI is determined to be associated with a generic identifier, the process proceeds to block 408, where a non-generic PTI is provisioned for the ID module, 214 or 314, of the user device, 202 or 320. In an embodiment, the provisioning process includes communications with a provisioning server 220 of a telecommunication service provider OTA to acquire a replacement PTI, indicating a particular service/rate plan to store at the ID module, 214 or 314. The replacement PTI may indicate either a prepaid rate plan or a postpaid, subscription-based rate plan, in accordance with a respective user's service level agreement with its telecommunication service provider. The process then proceeds to block 410, which is described below.

Alternatively, in a scenario where the received PTI is determined to be associated with an already-provisioned PTI, the process instead proceeds to block 410, where a provisioned PTI is compared to a corresponding device type identifier (DTI). Subsequently, at decision block 412 a determination is made as to whether the PTI matches, or otherwise corresponds to, the DTI. In one implementation, the comparison and PTI/DTI matching process can be made by a dedicated application residing the memory 206 of a user device 202, whereas in another implementation, the comparison and PTI/DTI matching can be made by a secure Trustlet application 320 residing in the TEE partition 318 of a user device 302.

In a scenario where a PTI/DTI match is determined to exist, the process proceeds to block 414, where the user device, 202 or 302, is unlocked, with or without OTA instructions from a corresponding telecommunication service provider. Alternatively, in a scenario where a PTI/DTI match is determined NOT to exist, the process instead proceeds to block 416, where the user device, 202 or 302, is locked, and a corresponding telecommunication service provider is optionally contacted OTA to determine whether a mismatched PTI or DTI can be reprovisioned. In one implementation, upon detecting a PTI/DTI mismatch, the user device, 202 or 302, can be configured to issue a corresponding mismatch notification to alert a user to the fact that their device, 202 or 302, is not authorized to access a service of a telecommunication service provider.

Next, at decision block 418, a determination is made as to whether a mismatched PTI or a mismatched DTI has been reprovisioned by the telecommunication service provider. In a scenario where neither a PTI nor a DTI has been reprovisioned, the user device, 202 or 302, remains locked and the process ends at block 420. Alternatively, in scenario where either the mismatched PTI or the mismatched DTI has been reprovisioned, the user device, 202 or 302, is unlocked at block 414, with or without OTA instructions from a corresponding telecommunication service provider. Subsequently, the process ends as block 420.

FIG. 5 depicts flow diagram procedure 500 associated with service plan identifier detection and provisioning implementation, in accordance with embodiments of the disclosure. The procedure begins at block 502, which may occur in accordance with any of the above device-side actions and/or provider-side actions, which require service authentication for a particular user device, 202 or 302. At block 504, a service identifier (SI) is retrieved from an ID module, 214 or 314, of an associated user device, 202 or 302. Next, at decision block 506, it is determined whether the retrieved SI is associated with a corresponding telecommunication service provider, from which the user device, 202 or 302, is requesting service access.

In a scenario where the SI is NOT associated with a serving telecommunication service provider, and is instead associated with an unapproved service provider, the process proceeds to block 508, where service access is blocked for the user device, 202 or 302. Subsequently the process ends at block 520. In one implementation, the determination as to whether the SI is associated with a particular telecommunication service provider can be made by a dedicated application residing in the memory 206 of a user device 202, whereas in another implementation, the determination can be made by a secure Trustlet application 320 residing in the TEE partition 318 of a user device 302.

Alternatively, in a scenario where the SI is determined to be associated with a serving telecommunication service provider, the process proceeds to decision block 508, where a determination is made as to whether the SI indicates a service plan associated with a telecommunication service. In one implementation, this determination may be made by a dedicated application residing in the memory 206 of a user device 202, whereas in another implementation, this determination can be made by a secure Trustlet application 320 residing in the TEE partition 318 of a user device 302. In a scenario where the a telecommunication service plan is NOT indicated by the SI, the process proceeds to block 512, where a service plan is associated with the SI, or is otherwise provisioned for the ID module, 214 or 314, of the user device, 202 or 320. In an embodiment, an associated service plan of the SI may indicate either a prepaid rate plan or a postpaid, subscription-based rate plan, in accordance with a respective user's service level agreement with its telecommunication service provider. The process then proceeds to decision block 514, which is described below.

Alternatively, in a scenario where a telecommunication service plan is determined to be indicated by the SI, the process proceeds to decision block 514, where a determination is made as to whether a service plan indicated by the SI matches a corresponding device service plan. In one implementation, the service plan matching may be made by a dedicated application residing in the memory 206 of a user device 202, whereas in another implementation, the service plan matching can be made by a secure Trustlet application 320 residing in the TEE partition 318 of a user device 302.

In a scenario where a service match is determined to exist, the process proceeds to block 516, where the user device, 202 or 302, is unlocked, with or without OTA instructions from a corresponding telecommunication service provider. Subsequently, the process ends at block 520. Alternatively, in a scenario where a service plan match is determined NOT to exist, the process instead proceeds to block 518, where the user device, 202 or 302, is locked. In one implementation, upon detecting a service plan mismatch, the user device, 202 or 302, can issue a corresponding a mismatch notification to alert a user to the fact that they are not authorized to access a service of the telecommunication service provider. Subsequently, the process ends at block 520.

FIG. 6 depicts flow diagram procedure 600 associated of a trusted execution environment (TEE) implementation at a user device 302, along with corresponding telecommunication service provider authentication processes, in accordance with embodiments of the disclosure. The procedure begins at block 602, in response to, or in conjunction with, a device boot sequence. At block 604, a user device 302 is initiated from within a TEE 318 during a secure boot process 322. Next, at block 606 a determination is made as to what type of SI has been acquired from an ID module 314 of the user device 302 via the TEE 318, e.g., using an associated Trustlet application 320. In an implementation, the type of SI may be associated with either a provisioned SI that has already been associated with a provider rate plan, or a non-provisioned SI that is not associated with a provider service plan.

Subsequently, at block 608, an optional provisioning of the SI occurs via the TEE 318, e.g., using an associated Trustlet application 320, in a scenario where the type of SI acquired from the ID module 314 is associated with a non-provisioned SI. In an embodiment, an SI of the ID module 314 can be provisioned with a rate plan of a service provider, where the rate plan corresponds to either a prepaid rate plan or a post-paid, subscription-based rate plan. Next, at block 610 a provisioned service plan indicated by a provisioned SI is compared to a device service plan 312 of the user device 302, via the TEE 318, e.g., using an associated Trustlet application 320. Based on the comparison, an authentication process can take place at block 612, whereby a service provider determines whether to grant the user device 302 access to its network service. Then, at block 614 an authenticated user device 302 can initiate its device OS 310 in order to perform normal run-time procedures of the user device 302. Subsequently the process ends at block 616.

What is claimed is:
1. A telecommunication device comprising:
one or more processors;
a memory coupled to the one or more processors and having at least a trusted execution environment (TEE) and a device operating system (OS);
an identification module storing a service identifier; and
an authentication module of the TEE configured to be operated by the one or more processors to:
retrieve the service identifier from the identification module, independent of an execution of the device OS;

authenticate access to a service of a telecommunication service provider based at least in part on the retrieved service identifier;

block access to a service of the telecommunication service provider when the service identifier of the identification module is determined to be associated with an unapproved telecommunication service provider; and determine whether to enable a device locking action or a device unlocking action.

2. The telecommunication device of claim 1, wherein the authentication module of the TEE is further configured to be operated by the one or more processors to:

determine that the service identifier corresponds to a generic identifier of a service provider, and in response, initiate a provisioning of a service plan identifier to the identification module via the TEE.

3. The telecommunication device of claim 2, further comprising a network interface, wherein the provisioning the service plan identifier to the identification module further comprises:

receiving the service plan identifier from the telecommunication service provider via the network interface, wherein the service plan identifier corresponds to either a prepaid rate plan or a postpaid rate plan of the telecommunication service provider; and replacing the determined generic identifier of the identification module with the received service plan identifier.

4. The system of claim 1, wherein the authentication module of the TEE is further configured to be operated by the one or more processors to:

compare a service plan corresponding to the service identifier to a device service plan via the TEE; and initiate the device unlocking action when the service plan corresponding to the service identifier matches the device service plan or initiate the device locking action when the service plan corresponding to the service identifier does not match the device service plan.

5. The system of claim 4, wherein the authentication module of the TEE is further configured to be operated by the one or more processors to:

generate a mismatch notification when the service plan corresponding to the service identifier is determined not to match the device service plan.

6. A method comprising:

retrieving a plan type identifier stored on an identification module of a telecommunication device; and authenticating access to a service of a telecommunication service provider for the telecommunication device, based at least in part on the retrieved plan type identifier, wherein the authenticating includes:

determining whether a plan type associated with the retrieved plan type identifier matches a device plan type of the telecommunication device, unlocking the telecommunication device when the plan type matches the device plan type of the telecommunication device; and locking the telecommunication device when the plan type does not match the device plan type of the telecommunication device.

7. The method of claim 6, further comprising:

determining the plan type identifier to be a generic identifier which identifies the telecommunication service provider but not a rate plan of the telecommunication service provider; and provisioning an updated plan type identifier that corresponds to a rate plan of the telecommunication service provider.

8. The method of claim 7, wherein provisioning the updated plan type identifier further comprises:

communicating with the telecommunication service provider using an over the air interface associated with the identification module; and replacing the plan type identifier stored on the identification module of the telecommunication device with the updated plan type identifier.

9. The method of claim 6, further comprising:

determining the plan type identifier to be a provisioned plan type identifier; and identifying a rate plan of the telecommunication service provider corresponding to the provisioned plan type identifier.

10. The method of claim 9, wherein the identified rate plan of the telecommunication service provider is associated with either a prepaid rate plan or a postpaid rate plan.

11. A method to authenticate a device on network, the method comprising:

retrieving a service identifier from an identification module, independent from an initial execution of an operating system (OS);

identifying a service plan of a telecommunication service provider based on the retrieved service identifier via a trusted execution environment (TEE);

determining whether the identified service plan corresponds to a designated service plan of the device;

determining whether to lock or unlock the device based at least in part on the determined correspondence between the identified service plan and the designated service plan of the device; and generating a mismatch notification when the identified service plan is determined not to correspond to the designated service plan of the device.

12. The method of claim 11, further comprising:

blocking access to a service of the telecommunication service provider when the service identifier of the identification module is determined to be associated with an unapproved telecommunication service provider.

13. The method of claim 11, wherein the identified service plan of the telecommunication service provider is associated with either a prepaid telecommunication service or a postpaid telecommunication service.

14. A computer storage device with a stored computer-executable program, which when executed by one or more processors, performs a method, comprising:

retrieving a service identifier from an identification module, wherein the service identifier indicates at least a telecommunication service provider; and authenticating access to a service of the telecommunication service provider based at least in part on the retrieved service identifier, the authenticating including:

determining whether a service plan corresponding to the service identifier matches a device service plan, and initiating a device unlocking action when the service plan corresponding to the service identifier matches the device service plan or initiating a device locking action when the service plan corresponding to the service identifier does not match the device service plan.

15. The computer storage device of claim 14, wherein the method further comprises:

determining the service identifier to correspond to a generic identifier of a service provider, and in response, initiating a provisioning of a service plan identifier to the identification module.

16. The computer storage device of claim 15, wherein the provisioning of the service plan identifier to the identification module further comprises:

receiving the service plan identifier from the telecommunication service provider via the network interface, wherein the service plan identifier corresponds to either a prepaid rate plan or a postpaid rate plan of the telecommunication service provider; and replacing the determined generic identifier of the identification module with the received service plan identifier.

17. The computer storage device of claim 14, wherein the method further comprises:

blocking access to a service of the telecommunication service provider when the service identifier of the identification module is determined to be associated with an unapproved telecommunication service provider.

* * * * *